(12) United States Patent
Pervan et al.

(10) Patent No.: US 10,100,535 B2
(45) Date of Patent: Oct. 16, 2018

(54) WOOD FIBRE BASED PANEL WITH A SURFACE LAYER

(71) Applicant: Välinge Innovation AB, Viken (SE)

(72) Inventors: Darko Pervan, Viken (SE); Goran Ziegler, Viken (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 14/593,521

(22) Filed: Jan. 9, 2015

(65) Prior Publication Data

US 2015/0197942 A1 Jul. 16, 2015

(30) Foreign Application Priority Data

Jan. 10, 2014 (SE) ...................... 1450023
May 12, 2014 (SE) ...................... 1450552
Sep. 29, 2014 (SE) ...................... 1451154

(51) Int. Cl.
*B32B 21/14* (2006.01)
*E04F 15/04* (2006.01)
(Continued)

(52) U.S. Cl.
CPC .............. *E04F 15/042* (2013.01); *B27G 1/00* (2013.01); *B27N 3/02* (2013.01); *B27N 3/04* (2013.01); *B27N 7/005* (2013.01); *B32B 3/30* (2013.01); *B32B 5/142* (2013.01); *B32B 21/02* (2013.01); *B32B 21/08* (2013.01); *B32B 21/14* (2013.01); *B32B 27/20* (2013.01); *B32B 27/42* (2013.01); *B32B 37/10* (2013.01); *B32B 37/1284* (2013.01); *B32B 37/18* (2013.01); *B44C 1/24* (2013.01); *B44C 5/043* (2013.01); *B44C 5/0438* (2013.01); *E04F 15/045* (2013.01);
(Continued)

(58) Field of Classification Search
None
See application file for complete search history.

(56) References Cited

U.S. PATENT DOCUMENTS 2,018,712 A * 10/1935 Elmendorf ............... B27D 1/06
 144/346
2,419,614 A * 4/1947 Welch ..................... B27D 1/04
 156/255
(Continued)

FOREIGN PATENT DOCUMENTS

AU 80284/75 6/1975
AU 2011236087 A1 5/2013
(Continued)

OTHER PUBLICATIONS

English Abstract for JP 51128409 A, Nov. 1976.*
(Continued)

*Primary Examiner* — Jeffrey A Vonch
(74) *Attorney, Agent, or Firm* — Buchanan Ingersoll & Rooney P.C.

(57) ABSTRACT

A building panel with a surface layer (1) including a wood veneer, a wood fibre based core (2) and a sub-layer (3) between the surface layer (1) and the core (2). The sub-layer (3) includes wood fibres (4) and a binder (5). The surface layer (1) has surface portions (6) including material from the sub-layer (3). The surface portions (6) including material from the sub-layer (3) extend into the wood veneer.

22 Claims, 1 Drawing Sheet

(51) Int. Cl.

| | | |
|---|---|---|
| *B27N 3/02* | (2006.01) | |
| *B32B 5/14* | (2006.01) | |
| *B32B 37/10* | (2006.01) | |
| *B32B 37/12* | (2006.01) | |
| *B32B 37/18* | (2006.01) | |
| *E04F 15/08* | (2006.01) | |
| *B32B 21/02* | (2006.01) | |
| *B32B 21/08* | (2006.01) | |
| *B32B 27/20* | (2006.01) | |
| *B32B 27/42* | (2006.01) | |
| *B32B 3/30* | (2006.01) | |
| *B27N 3/04* | (2006.01) | |
| *B27N 7/00* | (2006.01) | |
| *B44C 1/24* | (2006.01) | |
| *B44C 5/04* | (2006.01) | |
| *B27G 1/00* | (2006.01) | |
| *B27N 3/00* | (2006.01) | |
| *B27N 3/08* | (2006.01) | |
| *B32B 38/06* | (2006.01) | |

(52) U.S. Cl.
CPC .......... *E04F 15/082* (2013.01); *E04F 15/085* (2013.01); *B27N 3/005* (2013.01); *B27N 3/08* (2013.01); *B32B 38/06* (2013.01); *B32B 2262/067* (2013.01); *B32B 2264/062* (2013.01); *B32B 2266/0214* (2013.01); *B32B 2266/0285* (2013.01); *B32B 2266/14* (2016.11); *B32B 2305/073* (2013.01); *B32B 2307/4026* (2013.01); *B32B 2307/554* (2013.01); *B32B 2317/02* (2013.01); *B32B 2317/16* (2013.01); *B32B 2471/00* (2013.01); *B32B 2607/00* (2013.01); *Y10T 156/10* (2015.01); *Y10T 156/1039* (2015.01); *Y10T 428/24132* (2015.01); *Y10T 428/24298* (2015.01); *Y10T 428/24314* (2015.01); *Y10T 428/24322* (2015.01); *Y10T 428/24331* (2015.01); *Y10T 428/24339* (2015.01); *Y10T 428/24521* (2015.01); *Y10T 428/24603* (2015.01); *Y10T 428/24612* (2015.01); *Y10T 428/24802* (2015.01); *Y10T 428/24893* (2015.01); *Y10T 428/24992* (2015.01); *Y10T 428/24994* (2015.04); *Y10T 428/24995* (2015.04); *Y10T 428/249925* (2015.04); *Y10T 428/249959* (2015.04); *Y10T 428/249982* (2015.04); *Y10T 428/249985* (2015.04); *Y10T 428/249986* (2015.04); *Y10T 428/249987* (2015.04); *Y10T 428/25* (2015.01); *Y10T 428/253* (2015.01); *Y10T 428/256* (2015.01); *Y10T 428/257* (2015.01); *Y10T 428/3167* (2015.04); *Y10T 428/31862* (2015.04); *Y10T 428/31866* (2015.04); *Y10T 428/31957* (2015.04); *Y10T 428/31989* (2015.04)

(56) References Cited

U.S. PATENT DOCUMENTS

| | | | | |
|---|---|---|---|---|
| 2,587,064 | A | | 2/1952 | Rapson |
| 2,630,395 | A | | 3/1953 | McCullough |
| 2,634,534 | A | | 4/1953 | Brown |
| 2,695,857 | A | * | 11/1954 | Lewis ............. B27D 1/04 101/22 |
| 2,720,478 | A | | 10/1955 | Hogg |
| 2,831,793 | A | | 4/1958 | Elmendorf |
| 2,831,794 | A | | 4/1958 | Elmendorf |
| 2,932,596 | A | * | 4/1960 | Rayner ............ E04F 15/022 156/330 |
| 2,962,081 | A | * | 11/1960 | Dobry ............. B05C 19/00 118/310 |
| 2,992,152 | A | | 7/1961 | Chapman |
| 3,032,820 | A | | 5/1962 | Johnson |
| 3,135,643 | A | | 6/1964 | Michl |
| 3,286,006 | A | | 11/1966 | Annand |
| 3,308,013 | A | | 3/1967 | Bryant |
| 3,325,302 | A | | 6/1967 | Hosfeld |
| 3,342,621 | A | | 9/1967 | Point et al. |
| 3,345,234 | A | | 10/1967 | Jecker et al. |
| 3,392,082 | A | | 7/1968 | Lloyd |
| 3,426,730 | A | | 2/1969 | Lawson et al. |
| 3,463,653 | A | | 8/1969 | Letter |
| 3,486,484 | A | | 12/1969 | Bullough |
| 3,533,725 | A | | 10/1970 | Bridgeford |
| 3,540,978 | A | | 11/1970 | Ames |
| 3,565,665 | A | | 2/1971 | Stranch et al. |
| 3,578,522 | A | * | 5/1971 | Rauch ............. B27D 5/00 156/285 |
| 3,615,279 | A | | 10/1971 | Ward, Jr. |
| 3,673,020 | A | | 6/1972 | De Jaeger |
| 3,729,368 | A | | 4/1973 | Ingham |
| 3,844,863 | A | * | 10/1974 | Forsythe .......... B27G 1/00 144/346 |
| 3,846,219 | A | | 11/1974 | Kunz |
| 3,880,687 | A | | 4/1975 | Elmendorf et al. |
| 3,895,984 | A | * | 7/1975 | Cone ............... B05D 7/08 156/79 |
| 3,897,185 | A | | 7/1975 | Beyer |
| 3,897,588 | A | | 7/1975 | Nohtomi |
| 3,914,359 | A | | 10/1975 | Bevan |
| 3,956,542 | A | * | 5/1976 | Roberti ........... B27D 1/08 138/141 |
| 3,961,108 | A | | 6/1976 | Rosner et al. |
| 4,052,739 | A | | 10/1977 | Wada et al. |
| 4,093,766 | A | | 6/1978 | Scher et al. |
| 4,115,178 | A | * | 9/1978 | Cone ............... B27D 1/04 156/291 |
| 4,126,725 | A | | 11/1978 | Shiflet |
| 4,131,705 | A | | 12/1978 | Kubinsky |
| 4,277,527 | A | | 7/1981 | Duhl |
| 4,311,621 | A | | 1/1982 | Nishizawa et al. |
| 4,313,857 | A | | 2/1982 | Blount |
| 4,337,290 | A | | 6/1982 | Kelly et al. |
| 4,361,612 | A | * | 11/1982 | Shaner ............. B27N 3/06 428/106 |
| 4,420,351 | A | * | 12/1983 | Lussi .............. B32B 21/08 156/254 |
| 4,420,525 | A | | 12/1983 | Parks |
| 4,430,375 | A | | 2/1984 | Scher et al. |
| 4,474,920 | A | | 10/1984 | Kyminas et al. |
| 4,863,777 | A | | 9/1989 | Callaway et al. |
| 4,890,656 | A | | 1/1990 | Ohsumi et al. |
| 4,911,969 | A | * | 3/1990 | Ogata ............. B32B 21/02 428/67 |
| 4,942,084 | A | * | 7/1990 | Prince ............ B27D 1/00 428/464 |
| 5,034,272 | A | | 7/1991 | Lindgren et al. |
| 5,059,472 | A | | 10/1991 | LeBell et al. |
| 5,085,930 | A | | 2/1992 | Widmann et al. |
| 5,147,486 | A | * | 9/1992 | Hoffman .......... B27D 1/00 144/346 |
| 5,206,066 | A | | 4/1993 | Horacek |
| 5,246,765 | A | | 9/1993 | Lussi |
| 5,258,216 | A | | 11/1993 | Von Bonin et al. |
| 5,292,576 | A | | 3/1994 | Sanders |
| 5,314,554 | A | | 5/1994 | Owens |
| 5,405,705 | A | * | 4/1995 | Fujimoto ......... B32B 7/12 428/537.1 |
| 5,422,170 | A | | 6/1995 | Iwata et al. |
| 5,447,752 | A | | 9/1995 | Cobb |
| 5,466,511 | A | | 11/1995 | O'Dell et al. |
| 5,543,193 | A | | 8/1996 | Tesch |
| 5,569,424 | A | | 10/1996 | Amour |
| 5,601,930 | A | | 2/1997 | Mehta et al. |
| 5,604,025 | A | | 2/1997 | Tesch |
| 5,609,966 | A | | 3/1997 | Perrin et al. |

(56) References Cited

U.S. PATENT DOCUMENTS

| | | | |
|---|---|---|---|
| 5,755,068 A * | 5/1998 | Ormiston | B32B 3/30 |
| | | | 52/314 |
| 5,766,522 A | 6/1998 | Daly et al. | |
| 5,827,788 A | 10/1998 | Miyakoshi | |
| 5,855,832 A | 1/1999 | Clausi | |
| 5,891,564 A | 4/1999 | Shultz et al. | |
| 5,925,211 A * | 7/1999 | Rakauskas | B27D 1/00 |
| | | | 156/306.9 |
| 5,925,296 A | 7/1999 | Leese | |
| 5,942,072 A | 8/1999 | McKinnon | |
| 5,976,689 A * | 11/1999 | Witt | B27D 1/00 |
| | | | 428/339 |
| 6,036,137 A | 3/2000 | Myren | |
| 6,103,377 A | 8/2000 | Clausi | |
| 6,238,750 B1 | 5/2001 | Correll et al. | |
| 6,291,625 B1 | 9/2001 | Hosgood | |
| 6,468,645 B1 | 10/2002 | Clausi | |
| 6,481,476 B1 * | 11/2002 | Okamoto | B27D 1/08 |
| | | | 144/350 |
| 6,521,326 B1 | 2/2003 | Fischer et al. | |
| 6,528,437 B1 | 3/2003 | Hepfinger et al. | |
| 6,537,610 B1 | 3/2003 | Springer et al. | |
| 6,620,349 B1 | 9/2003 | Lopez | |
| 6,667,108 B2 * | 12/2003 | Ellstrom | B32B 21/14 |
| | | | 156/228 |
| 6,769,217 B2 | 8/2004 | Nelson | |
| 6,773,799 B1 | 8/2004 | Persson et al. | |
| 6,803,110 B2 | 10/2004 | Drees et al. | |
| 6,926,954 B2 | 8/2005 | Shuren et al. | |
| 6,991,830 B1 | 1/2006 | Hansson et al. | |
| 7,022,756 B2 | 4/2006 | Singer | |
| 7,485,693 B2 | 2/2009 | Matsuda et al. | |
| 7,811,489 B2 | 10/2010 | Pervan | |
| 8,021,741 B2 | 9/2011 | Chen | |
| 8,245,477 B2 * | 8/2012 | Pervan | B32B 21/02 |
| | | | 52/592.1 |
| 8,302,367 B2 | 11/2012 | Schulte | |
| 8,349,234 B2 | 1/2013 | Ziegler et al. | |
| 8,349,235 B2 | 1/2013 | Pervan et al. | |
| 8,407,963 B2 | 4/2013 | Schulte | |
| 8,419,877 B2 | 4/2013 | Pervan et al. | |
| 8,431,054 B2 | 4/2013 | Pervan et al. | |
| 8,480,841 B2 | 7/2013 | Pervan et al. | |
| 8,481,111 B2 | 7/2013 | Ziegler et al. | |
| 8,499,520 B2 | 8/2013 | Schulte | |
| 8,617,439 B2 | 12/2013 | Pervan et al. | |
| 8,635,829 B2 | 1/2014 | Schulte | |
| 8,650,738 B2 | 2/2014 | Schulte | |
| 8,663,785 B2 | 3/2014 | Ziegler et al. | |
| 8,728,564 B2 | 5/2014 | Ziegler et al. | |
| 8,752,352 B2 | 6/2014 | Schulte | |
| 8,784,587 B2 | 7/2014 | Lindgren et al. | |
| 8,920,874 B2 | 12/2014 | Ziegler et al. | |
| 8,920,876 B2 | 12/2014 | Vetter et al. | |
| 8,993,049 B2 | 3/2015 | Pervan | |
| 9,085,905 B2 | 7/2015 | Persson et al. | |
| 9,109,366 B2 | 8/2015 | Schulte | |
| 9,181,698 B2 | 11/2015 | Pervan et al. | |
| 9,255,405 B2 | 2/2016 | Pervan et al. | |
| 9,296,191 B2 | 3/2016 | Pervan et al. | |
| 9,352,499 B2 | 5/2016 | Ziegler et al. | |
| 9,403,286 B2 | 8/2016 | Vetter et al. | |
| 9,410,319 B2 | 8/2016 | Ziegler et al. | |
| 9,556,622 B2 | 1/2017 | Pervan et al. | |
| 9,783,996 B2 | 10/2017 | Pervan et al. | |
| 2001/0006704 A1 | 7/2001 | Chen et al. | |
| 2001/0009309 A1 | 7/2001 | Taguchi et al. | |
| 2002/0031620 A1 * | 3/2002 | Yuzawa | B27D 1/00 |
| | | | 428/1.1 |
| 2002/0054994 A1 | 5/2002 | Dupre et al. | |
| 2002/0100231 A1 | 8/2002 | Miller | |
| 2002/0155297 A1 * | 10/2002 | Schuren | B32B 21/02 |
| | | | 428/413 |
| 2003/0008130 A1 | 1/2003 | Kaneko | |
| 2003/0056873 A1 | 3/2003 | Nakos et al. | |
| 2003/0059639 A1 | 3/2003 | Worsley | |
| 2003/0102094 A1 | 6/2003 | Tirri et al. | |
| 2003/0108760 A1 | 6/2003 | Haas et al. | |
| 2003/0208980 A1 | 11/2003 | Miller et al. | |
| 2004/0088946 A1 * | 5/2004 | Liang | B27N 7/005 |
| | | | 52/782.1 |
| 2004/0123542 A1 | 7/2004 | Grafenauer | |
| 2004/0191547 A1 | 9/2004 | Oldorff | |
| 2004/0202857 A1 | 10/2004 | Singer | |
| 2004/0206036 A1 | 10/2004 | Pervan | |
| 2004/0237436 A1 | 12/2004 | Zuber et al. | |
| 2004/0250911 A1 | 12/2004 | Vogel | |
| 2005/0003099 A1 | 1/2005 | Quist | |
| 2005/0016107 A1 | 1/2005 | Rosenthal et al. | |
| 2005/0079780 A1 | 4/2005 | Rowe et al. | |
| 2005/0136234 A1 | 6/2005 | Hak et al. | |
| 2005/0153150 A1 * | 7/2005 | Wellwood | B27D 1/04 |
| | | | 428/537.1 |
| 2005/0193677 A1 | 9/2005 | Vogel | |
| 2005/0208255 A1 | 9/2005 | Pervan | |
| 2005/0227040 A1 | 10/2005 | Toupalik | |
| 2005/0252130 A1 | 11/2005 | Martensson | |
| 2006/0008630 A1 | 1/2006 | Thiers et al. | |
| 2006/0024465 A1 | 2/2006 | Briere | |
| 2006/0032175 A1 | 2/2006 | Chen et al. | |
| 2006/0048474 A1 | 3/2006 | Pervan et al. | |
| 2006/0070321 A1 | 4/2006 | Au | |
| 2006/0070325 A1 | 4/2006 | Magnusson | |
| 2006/0145384 A1 | 7/2006 | Singer | |
| 2006/0154015 A1 * | 7/2006 | Miller | B32B 7/02 |
| | | | 428/50 |
| 2006/0172118 A1 * | 8/2006 | Han | B32B 21/02 |
| | | | 428/156 |
| 2006/0182938 A1 | 8/2006 | Oldorff | |
| 2006/0183853 A1 | 8/2006 | Sczepan | |
| 2007/0055012 A1 | 3/2007 | Caldwell | |
| 2007/0066176 A1 | 3/2007 | Wenstrup et al. | |
| 2007/0102108 A1 * | 5/2007 | Zheng | B27D 1/04 |
| | | | 156/272.2 |
| 2007/0148339 A1 | 6/2007 | Wescott | |
| 2007/0166516 A1 | 7/2007 | Kim et al. | |
| 2007/0184244 A1 | 8/2007 | Doehring | |
| 2007/0207296 A1 | 9/2007 | Eisermann | |
| 2007/0218260 A1 | 9/2007 | Miclo et al. | |
| 2007/0224438 A1 | 9/2007 | Van Benthem et al. | |
| 2007/0256804 A1 | 11/2007 | Garcis Espino et al. | |
| 2008/0000179 A1 | 1/2008 | Pervan et al. | |
| 2008/0000417 A1 | 1/2008 | Pervan et al. | |
| 2008/0032120 A1 | 2/2008 | Braun | |
| 2008/0090032 A1 | 4/2008 | Perrin et al. | |
| 2008/0093013 A1 * | 4/2008 | Muller | B29C 45/14688 |
| | | | 156/153 |
| 2008/0152876 A1 * | 6/2008 | Magnusson | B32B 43/00 |
| | | | 428/195.1 |
| 2008/0176039 A1 | 7/2008 | Chen et al. | |
| 2008/0263985 A1 | 10/2008 | Hasch et al. | |
| 2009/0056257 A1 | 3/2009 | Mollinger et al. | |
| 2009/0124704 A1 | 5/2009 | Jenkins | |
| 2009/0135356 A1 | 5/2009 | Ando | |
| 2009/0145066 A1 | 6/2009 | Pervan | |
| 2009/0155612 A1 | 6/2009 | Pervan et al. | |
| 2009/0208646 A1 | 8/2009 | Kreuder et al. | |
| 2009/0294037 A1 | 12/2009 | Oldorff | |
| 2009/0311433 A1 | 12/2009 | Wittmann | |
| 2010/0092731 A1 | 4/2010 | Pervan et al. | |
| 2010/0136303 A1 | 6/2010 | Kreuder | |
| 2010/0196678 A1 | 8/2010 | Vermeulen | |
| 2010/0223881 A1 | 9/2010 | Kalwa | |
| 2010/0239820 A1 | 9/2010 | Buhlmann | |
| 2010/0291397 A1 | 11/2010 | Pervan et al. | |
| 2010/0300030 A1 | 12/2010 | Pervan et al. | |
| 2010/0304089 A1 * | 12/2010 | Magnusson | B27M 1/003 |
| | | | 428/158 |
| 2010/0307675 A1 | 12/2010 | Buhlmann | |
| 2010/0307677 A1 | 12/2010 | Buhlmann | |
| 2010/0314368 A1 | 12/2010 | Groeke | |
| 2010/0319282 A1 | 12/2010 | Ruland | |

(56) References Cited

U.S. PATENT DOCUMENTS

| | | |
|---|---|---|
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0262720 A1* | 10/2011 | Riebel .................. B32B 7/12 428/195.1 |
| 2011/0274872 A1* | 11/2011 | Yu .......................... B27D 1/04 428/106 |
| 2011/0283642 A1 | 11/2011 | Meirlaen et al. |
| 2011/0283650 A1 | 11/2011 | Pervan et al. |
| 2011/0287211 A1 | 11/2011 | Bailey et al. |
| 2011/0293823 A1 | 12/2011 | Bruderer et al. |
| 2011/0293906 A1 | 12/2011 | Jacobsson |
| 2012/0048487 A1 | 3/2012 | Brewster |
| 2012/0124932 A1 | 5/2012 | Schulte et al. |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0276348 A1* | 11/2012 | Clausi ................. E04F 13/002 428/196 |
| 2012/0288689 A1 | 11/2012 | Hansson et al. |
| 2012/0308774 A1 | 12/2012 | Persson et al. |
| 2013/0025216 A1 | 1/2013 | Reichwein et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0196119 A1* | 8/2013 | Dobecz ................ B32B 37/003 428/172 |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0027020 A1* | 1/2014 | Klaeusler .............. B27L 5/00 144/351 |
| 2014/0044872 A1 | 2/2014 | Pervan |
| 2014/0075874 A1 | 3/2014 | Pervan et al. |
| 2014/0147585 A1 | 5/2014 | Smith |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2014/0290171 A1 | 10/2014 | Vermeulen |
| 2015/0017461 A1 | 1/2015 | Lindgren et al. |
| 2015/0072111 A1 | 3/2015 | Rischer et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0159382 A1 | 6/2015 | Pervan |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0368180 A1 | 12/2016 | Ziegler et al. |
| 2016/0369507 A1 | 12/2016 | Pervan et al. |
| 2016/0375674 A1 | 12/2016 | Schulte |
| 2017/0120564 A1* | 5/2017 | Schulte ................ B32B 21/042 |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |

FOREIGN PATENT DOCUMENTS

| | | | | |
|---|---|---|---|---|
| CA | 2 557 096 A1 | 7/2005 | | |
| CA | 2 852 656 A1 | 4/2013 | | |
| CH | 298894 A | 5/1954 | | |
| CN | 17909717 A * | 12/2005 | | |
| CN | 102166775 A * | 8/2011 | | |
| CN | 202200608 U * | 4/2012 | | |
| CN | 104084994 A | 10/2014 | | |
| DE | 1 815 312 A1 | 7/1969 | | |
| DE | 7148789 U | 4/1972 | | |
| DE | 29 39 828 A1 | 4/1981 | | |
| DE | 33 34 921 A1 | 4/1985 | | |
| DE | 36 34 885 A1 | 4/1988 | | |
| DE | 4233050 A1 * | 4/1993 | ............. A47B 96/18 |
| DE | 42 36 266 A1 | 5/1993 | | |
| DE | 202 14 532 U1 | 2/2004 | | |
| DE | 102 45 914 A1 | 4/2004 | | |
| DE | 103 00 247 A1 | 7/2004 | | |
| DE | 103 31 657 A1 | 2/2005 | | |
| DE | 20 2004 003 061 U1 | 7/2005 | | |
| DE | 10 2004 050 278 A1 | 4/2006 | | |
| DE | 20 2006 007 797 U1 | 8/2006 | | |
| DE | 10 2005 046 264 A1 | 4/2007 | | |
| DE | 10 2006 024 593 A1 | 12/2007 | | |
| DE | 10 2006 058 244 A1 | 6/2008 | | |
| DE | 102007043202 A1 * | 3/2009 | ............... B44C 1/24 |
| DE | 202009008367 U1 * | 9/2009 | ........ E04F 15/02166 |
| DE | 10 2010 045 266 A | 3/2012 | | |
| DE | 20 2013 011 776 U1 | 7/2014 | | |
| DE | 20 2014 102 031 U1 | 7/2014 | | |
| DE | 20 2013 012 020 U1 | 2/2015 | | |
| EP | 0 129 430 A2 | 12/1984 | | |
| EP | 0 234 220 A2 | 9/1987 | | |
| EP | 0 129 430 B1 | 1/1990 | | |
| EP | 0 355 829 A2 | 2/1990 | | |
| EP | 0 611 408 A1 | 12/1993 | | |
| EP | 0 592 013 A2 | 4/1994 | | |
| EP | 0 656 443 A1 | 6/1995 | | |
| EP | 0 611 408 B1 | 9/1996 | | |
| EP | 0 732 449 A1 | 9/1996 | | |
| EP | 0 744 477 A2 | 11/1996 | | |
| EP | 0 914 914 A2 | 5/1999 | | |
| EP | 0 732 449 B1 | 8/1999 | | |
| EP | 0 744 477 B1 | 1/2000 | | |
| EP | 0993934 A2 * | 4/2000 | ............. B29C 33/02 |
| EP | 1 035 255 A1 | 9/2000 | | |
| EP | 1 125 971 A1 | 8/2001 | | |
| EP | 1 136 251 A2 | 9/2001 | | |
| EP | 1 193 288 A1 | 4/2002 | | |
| EP | 1 209 199 A1 | 5/2002 | | |
| EP | 1 242 702 A1 | 9/2002 | | |
| EP | 1 249 322 A1 | 10/2002 | | |
| EP | 1262607 A1 * | 12/2002 | ............. B32B 21/08 |
| EP | 1 454 763 A2 | 9/2004 | | |
| EP | 1 242 702 B1 | 11/2004 | | |
| EP | 1 498 241 A2 | 1/2005 | | |
| EP | 1 507 664 A1 | 2/2005 | | |
| EP | 1 507 664 B1 | 2/2005 | | |
| EP | 1 584 378 A1 | 10/2005 | | |
| EP | 1 657 055 A1 | 5/2006 | | |
| EP | 1 681 103 A2 | 7/2006 | | |
| EP | 1 690 603 A1 | 8/2006 | | |
| EP | 1 808 311 A1 | 7/2007 | | |
| EP | 1 847 385 A1 | 10/2007 | | |
| EP | 1 961 556 A1 | 8/2008 | | |
| EP | 1 985 464 A1 | 10/2008 | | |
| EP | 1 997 623 A1 | 12/2008 | | |
| EP | 2 025 484 A1 | 2/2009 | | |
| EP | 1 454 763 B1 | 8/2009 | | |
| EP | 2 105 320 A1 | 9/2009 | | |
| EP | 2 119 550 A1 | 11/2009 | | |
| EP | 2 213 476 A1 | 8/2010 | | |
| EP | 2 226 201 A1 | 9/2010 | | |
| EP | 2 246 500 A2 | 11/2010 | | |
| EP | 2 263 867 A1 | 12/2010 | | |
| EP | 2 264 259 A2 | 12/2010 | | |
| EP | 2 272 667 A1 | 1/2011 | | |
| EP | 2 272 668 A1 | 1/2011 | | |
| EP | 2 305 462 A1 | 4/2011 | | |
| EP | 1 847 385 B1 | 9/2011 | | |
| EP | 2 415 947 A2 | 2/2012 | | |
| EP | 2 263 867 B1 | 3/2012 | | |

(56) References Cited

FOREIGN PATENT DOCUMENTS

| | | |
|---|---|---|
| EP | 2 902 196 A1 | 1/2014 |
| EP | 2 902 196 B1 | 8/2016 |
| FR | 801 433 A | 8/1936 |
| FR | 2 873 953 A1 | 2/2006 |
| GB | 984 170 A | 2/1965 |
| GB | 1090450 | 11/1967 |
| GB | 1 561 820 A | 3/1980 |
| GB | 2 238 983 A | 6/1991 |
| GB | 2 248 246 A | 4/1992 |
| GB | 2 464 541 A | 4/2010 |
| JP | 51128409 A * | 11/1976 |
| JP | 52087212 A * | 7/1977 |
| JP | S52-087212 A | 7/1977 |
| JP | 56049259 A * | 5/1981 ............ A47B 96/18 |
| JP | 56151564 A * | 11/1981 |
| JP | 58084761 A * | 5/1983 |
| JP | 59101312 A * | 6/1984 |
| JP | 64062108 A * | 3/1989 |
| JP | 02198801 A * | 8/1990 |
| JP | 2-229002 A | 9/1990 |
| JP | 03030905 A * | 2/1991 |
| JP | 03211047 A * | 9/1991 |
| JP | 03267174 A * | 11/1991 |
| JP | 04107101 A * | 4/1992 |
| JP | 04247901 A * | 9/1992 |
| JP | 04269506 A * | 9/1992 |
| JP | 05077362 A * | 3/1993 |
| JP | 05237809 A * | 9/1993 |
| JP | 06312406 A * | 11/1994 |
| JP | 08207012 A * | 8/1996 |
| JP | 09164651 A * | 6/1997 |
| JP | 10002098 A * | 1/1998 |
| JP | H10-18562 A | 1/1998 |
| JP | 11-291203 A | 10/1999 |
| JP | 2000226931 A * | 8/2000 |
| JP | 2000263520 A * | 9/2000 |
| JP | 2001-287208 A | 10/2001 |
| JP | 2001329681 A * | 11/2001 |
| JP | 2003-311717 A | 11/2003 |
| JP | 2003-311718 A | 11/2003 |
| JP | 2004068512 A * | 3/2004 |
| JP | 2004076476 A * | 3/2004 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-098755 A | 4/2007 |
| JP | 2007-216692 A | 8/2007 |
| JP | 2007-268843 A | 10/2007 |
| JP | 2008-188826 A | 8/2008 |
| JP | 2010017963 A * | 1/2010 |
| JP | 2011110768 A * | 6/2011 |
| NZ | 225556 A1 | 2/1992 |
| SE | 469 326 B | 6/1993 |
| WO | WO 92/06832 A1 | 4/1992 |
| WO | WO 93/24295 A1 | 12/1993 |
| WO | WO 93/24296 A1 | 12/1993 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/48333 A1 | 7/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/050359 A1 | 6/2004 |
| WO | WO 2004/067874 A2 | 8/2004 |
| WO | WO 2005/035209 A2 | 4/2005 |
| WO | WO 2005/035209 A3 | 4/2005 |
| WO | WO 2005/035209 B1 | 4/2005 |
| WO | WO 2005/054599 A1 | 6/2005 |
| WO | WO 2005/054600 A1 | 6/2005 |
| WO | WO 2005/066431 A2 | 7/2005 |
| WO | WO 2005/080096 A2 | 9/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/015313 A2 | 2/2006 |
| WO | WO 2006/042651 A1 | 4/2006 |
| WO | WO 2006/043893 A1 | 4/2006 |
| WO | WO 2006/066776 A2 | 6/2006 |
| WO | WO 2006/126930 A1 | 11/2006 |
| WO | WO-2006126930 A1 * | 11/2006 ............ E04F 15/02 |
| WO | WO 2007/015669 A2 | 2/2007 |
| WO | WO 2007/015669 A3 | 2/2007 |
| WO | WO 2007/042258 A1 | 4/2007 |
| WO | WO 2007/059294 A2 | 5/2007 |
| WO | WO 2008/004960 A2 | 1/2008 |
| WO | WO 2008/004960 A8 | 1/2008 |
| WO | WO 2008/148771 A1 | 12/2008 |
| WO | WO 2009/015682 A1 | 2/2009 |
| WO | WO 2009/050565 A1 | 4/2009 |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/046698 A1 | 4/2010 |
| WO | WO 2010/084466 A2 | 7/2010 |
| WO | WO 2010/087752 A1 | 8/2010 |
| WO | WO 2010/094500 A1 | 8/2010 |
| WO | WO 2011/087422 A1 | 7/2011 |
| WO | WO 2011/087423 A1 | 7/2011 |
| WO | WO 2011/087424 A1 | 7/2011 |
| WO | WO 2011/129755 A2 | 10/2011 |
| WO | WO 2011/129757 A1 | 10/2011 |
| WO | WO 2011/141851 A2 | 11/2011 |
| WO | WO 2012/004699 A2 | 1/2012 |
| WO | WO 2012/076608 A1 | 6/2012 |
| WO | WO 2012/141647 A1 | 10/2012 |
| WO | WO 2012/154113 A1 | 11/2012 |
| WO | WO 2013/056745 A1 | 4/2013 |
| WO | WO 2013/079950 A1 | 6/2013 |
| WO | WO 2013/139460 A1 | 9/2013 |
| WO | WO 2013/182191 A2 | 12/2013 |
| WO | WO 2014/017972 A1 | 1/2014 |
| WO | WO 2014/109699 A1 | 7/2014 |
| WO | WO 2015/078434 A1 | 6/2015 |
| WO | WO 2015/078443 A1 | 6/2015 |
| WO | WO 2015/078444 A1 | 6/2015 |
| WO | WO 2015/105455 A1 | 7/2015 |
| WO | WO 2015/105456 A1 | 7/2015 |
| WO | WO 2015/174909 A1 | 11/2015 |

OTHER PUBLICATIONS

English Abstract for JP 03211047 A, Sep. 1991.*
Machine Translation & Abstract of JP 58084761 A, May 1983.*
Machine Translation & Abstract of JP 59101312 A, Jun. 1984.*
Machine Translation & Abstract of JP 02198801 A, Aug. 1990.*
Machine Translation of JP 2011110768 A, Jun. 2011.*
International Search Report (Form PCT/ISA/210) issued in corresponding PCT/SE2015/050007, dated Apr. 17, 2015, 7 pages, ISA/SE, Patent-och registreringsverket, Stockholm, SE.
U.S. Appl. No. 14/192,169, filed Feb. 27, 2014, Darko Pervan, Kent Lindgren, Jan Jacobsson, Niclas Håkansson, Eddy Boucké and Göran Ziegler (Cited herein as US Patent Application Publication No. 2014/0178630 A1 of Jun. 26, 2014).
U.S. Appl. No. 14/593,458, filed Jan. 9, 2015, Göran Ziegler, Per Nygren and Thomas Meijer.

(56) References Cited

OTHER PUBLICATIONS

U.S. Appl. No. 14/593,458, Pervan, et al.
Parquet International, "Digital Printing is still an expensive process," Mar. 2008, cover page/pp. 78-79, www.parkettmagazin.com.
Floor Daily, "Shaw Laminates: Green by Design," Aug. 13, 2007, 1 pg, Dalton, GA.
BTLSR Toledo, Inc. website. http://www.bltresins.com/more.html. "Advantages to Using Powdered Resins," May 26, 2007, 2 pages, per the Internet Archive WayBackMachine.
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Le Fur, X., et al., "Recycling melamine-impregnated paper waste as board adhesives," published online Oct. 26, 2004, pp. 419-423, vol. 62, Springer-Verlag, DE.
Odian, George, "Principles of Polymerization," 1991, $3^{rd}$ Edition, 5 pages incl. pp. 122-123, John Wiley & Sons, Inc., New York, NY, USA.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
Ziegler, Göran, et al., U.S. Appl. No. 14/593,458 entitled "Method of Producing Veneered Element," filed Jan. 9, 2015.
U.S. Appl. No. 15/308,737, Lundblad, et al.
Lundblad, Christer, et al., U.S. Appl. No. 15/308,737, entitled "A Method of Producing a Veneered Element and Such a Veneered Element," filed Nov. 3, 2016.
U.S. Appl. No. 15/183,424, Pervan, et al.
Pervan, Darko, et al., U.S. Appl. No. 15/183,424 entitled "Method of Forming a Building Panel or Surface Element and Such a Building Panel and Surface Element", filed Jun. 15, 2016.
U.S. Appl. No. 15/496,357, Bergelin, et al.
Bergelin, Marcus, et al., U.S. Appl. No. 15/496,357, entitled "A Veneered Element and Method of Producing Such a Veneered Element," filed Apr. 25, 2017.
Extended European Search Report issued in EP 15735032.3, dated Aug. 30, 2017, European Patent Office, Munich, DE, 11 pages.
U.S. Appl. No. 15/039,638, filed May 26, 2016, Guido Schulte (Cited herein as US Patent Application Publication No. 2017/0120564 A1 of May 4, 2017).
U.S. Appl. No. 15/039,748, filed May 26, 2016, Guido Schulte (Cited herein as US Patent Application Publication No. 2016/0375674 A1 of Dec. 29, 2016).
U.S. Appl. No. 15/039,504, filed May 26, 2016, Guido Schulte (Cited herein as US Patent Application Publication No. 2017/0165936 A1 of Jun. 15, 2017).
U.S. Appl. No. 15/308,737, filed Nov. 3, 2016, Christer Lundblad.
U.S. Appl. No. 15/183,424, filed Jun. 15, 2016, Darko Pervan.

* cited by examiner

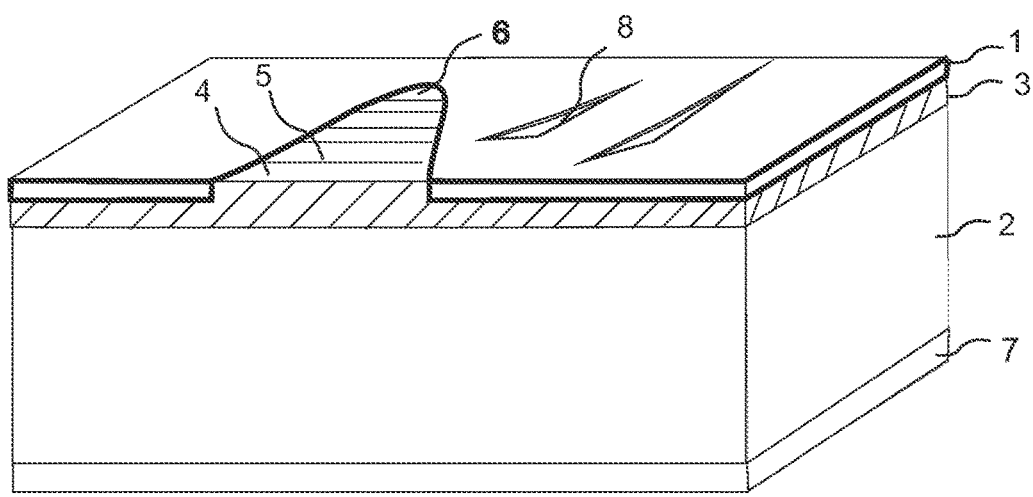

WOOD FIBRE BASED PANEL WITH A SURFACE LAYER

CROSS REFERENCE TO RELATED APPLICATIONS

The present application claims the benefit of Swedish Application No. 1450023-5, filed on Jan. 10, 2014, the benefit of Swedish Application No. 1450552-3, filed on May 12, 2014, and the benefit of Swedish Application No. 1451154-7, filed on Sep. 29, 2014. The entire contents of each of Swedish Application No. 1450023-5, Swedish Application No. 1450552-3, and Swedish Application No. 1451154-7 are hereby incorporated herein by reference in their entirety.

TECHNICAL FIELD

The disclosure generally relates but is not limited to the field of wood fibre based building panels with a surface layer, preferably floor panels, wall panels and furniture components.

TECHNICAL BACKGROUND

Embodiments of the disclosure are particularly suitable for use in floating floors, which are formed of floor panels with a wood fibre core and a decorative wear resistant surface. The following description of known technique, problems of known systems and objects and features of the disclosure will therefore, as a non-restrictive example, be aimed above all at this field of application and in particular at floorings which are similar to traditional wood fibre based laminate floorings.

It should be emphasized that the embodiments of the disclosure can also be used in other applications as, for example, wall panels, ceilings, furniture components, and similar.

KNOWN TECHNIQUE AND PROBLEMS THEREOF

Several technologies are used to provide a floor panel, which is a copy of a solid floor panel. The reason is that copies may be produced more cost efficient and a floor with a separate layer attached to a core of for example HDF or plywood is more moisture stable than solid wood floors.

Wood fibre based direct pressed laminated flooring usually comprises a core of a 6-12 mm fibre board, a 0.2 mm thick upper decorative surface layer of laminate and a 0.1-0.2 mm thick lower balancing layer of laminate, plastic, paper or like material.

A laminate surface generally comprise two paper sheets, a 0.1 mm thick printed decorative paper and a transparent 0.05-0.1 mm thick overlay intended to protect the decorative paper from abrasion. The transparent overlay, which is made of α-cellulose fibres, comprises small hard and transparent aluminium oxide particles, which gives the surface layer a high wear resistance.

The printed decorative paper and the overlay are impregnated with melamine resin and laminated to a wood fibre based core under heat and pressure. The two papers have prior to pressing a total thickness of about 0.3 mm and they are after pressing compressed to about 0.2 mm.

Other common surface materials are wood veneer and foils, which are glued to a core. The surface may also be a powder layer comprising wood fibres, melamine resins, colour pigments and aluminium oxide particles.

Wood veneers may provide the most natural copies. The disadvantage is that a wood veneer generally has a lower impact resistance than laminate floors and the production cost is high when high quality veneers may be used It is known that a wood veneer may be pressed on a powder layer as described above and that such a powder layer may provide increased impact resistance. This will not solve the cost problems.

U.S. Pat. No. 2,831,793 discloses a composite wood veneer panel. A thin veneer is applied to a composite fibrous core of ligno-cellulose particles and binder and openings of the veneer are filled with core material when pressed together to form the composite panel. In the manufacture of the plywood or veneered panels according to this document, the plugging of the surface layer opening defects is done simultaneously with the formation of the board.

SUMMARY

The objective of at least certain embodiments of the disclosure is to provide a building panel, such as a floor panel, with a wood based surface layer, which has a more attractive surface design and/or better surface properties and/or cost structure than present known floorings.

At least some of these and other objects and advantages that will be apparent from the description have been achieved by a building panel comprising a surface layer comprising a wood veneer, a wood fibre based core, and a sub-layer arranged between the surface layer and the wood fibre based core. The sub-layer comprises wood fibres and a binder. The surface layer has surface portions comprising material from the sub-layer extending into the wood veneer.

By extending into the wood veneer is meant that the material from the sub-layer extends, for example, at least into ⅓ of the thickness of the wood veneer. In one embodiment, the material of the sub-layer extends completely through the wood veneer.

The surface portions comprising material from the sub-layer may be flush with a remainder of the surface layer.

In an embodiment, the core may be a wood-based board, for example, a wood-fibre based board such as MDF or HDF, or plywood. The core may be a Wood Plastic Composite (WPC). In an embodiment, the core may be a mineral composite board, a fibre cement board, a magnesium oxide cement board, a ceramic board, or a plastic board such as a thermoplastic board.

Preferably, the core is a pre-fabricated core.

In an embodiment, the veneer layer may be a wood veneer, a cork veneer, or a stone veneer.

In an embodiment, the sub-layer may comprise a filler and a binder. The fillers may be particles or fibres, for example wood fibres or particles, or mineral particles or fibres. The wood particles may be lignocellulosic particles and/or cellulosic particles. The wood particles may be at least partially bleached. The fillers may be rice, straw, corn, jute, linen, flax, cotton, hemp, bamboo, bagasse or sisal particles or fibres. The filler may be starch such as maize starch, potato starch, etc.

The thickness of the veneer may be in the range of about 0.2 mm to about 1 mm.

The building panel may be provided with a thinner veneer than known building panels with veneer, since the sub-layer reinforces the veneer.

The building panel may be provided with a partly broken veneer that comprises holes, such as cracks, through the veneer. The sub-layer may protrude through the holes and level the surface layer. The sub-layer may be used as an alternative for putty for a building panel with a broken surface layer. Material from the sub-layer may fill holes, such as cracks, of the veneer.

The veneer may also be pre-treated prior to pressing, for example, be brushed.

The surface layer may comprise embossed portions and a part of the sub-layer may be more compressed under an embossed portion than under a non-embossed surface portion.

The embossed portions may be naturally occurring after pressing. For wood veneers having a porous structure, such as hard wood (e.g., angiosperm), porous portions of the veneer form embossed portions after pressing, since these portions do not spring back from their compressed state when the pressure is released. These porous portions are filled with the binder of the sub-layer during pressing. Then the binder cures and/or hardens, the binder locks the position of the porous portions in the compressed state.

The portions of veneer having high density, i.e. being non-porous, are compressed during pressing but spring back when the pressure is released, thus forming protrusions of the surface layer. The high-density portions do not absorb enough binder from the sub-layer to be locked by the hardened binder after pressing.

For wood veneer having a non-porous structure, such as soft wood (e.g., gymnosperm), the summer wood annual rings (also called late wood annual rings), having high density, are not compressible during pressing. Instead, the summer wood annual rings are pressed into the sub-layer such that the sub-layer is compressed. The summer wood annual rings form embossed portions of the surface layer. The spring wood annual rings (also called early wood annual rings) are compressible during pressing. During pressing, the spring wood annual rings are compressed. Then the pressure is released, the spring wood annual rings spring back, and form protrusions.

The embossed portions of the surface layer may also be formed by pressing by an embossed pressing device, such as an embossed press plate.

The building panel may comprise a powder based balancing layer. The powder based balancing layer may comprise cellulose or lignocellulosic particles and a binder. In one embodiment, the building panel comprises a balancing layer comprising a resin impregnated paper, preferably impregnated with a thermosetting binder.

The building panel may be a floor panel comprising a powder based balancing layer. The powder based balancing layer may comprise cellulose or lignocellulosic particles and a binder. In one embodiment, the floor panel comprises a balancing layer comprising a resin impregnated paper, preferably impregnated with a thermosetting binder.

The binder in the sub-layer may be a thermosetting resin.

The binder in the sub-layer may be a melamine resin. The binder in the sub-layer may be an amino resin, such as melamine formaldehyde resin, urea formaldehyde resin, phenol formaldehyde resin, or a combination thereof.

The binder in the sub-layer may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The binder may be wood mastic, wood filler or any other type of putty-like paste.

The sub-layer may be substantially or completely formaldehyde free.

The wood fibres in the sub-layer may be lignocellulosic and/or cellulosic particles. The wood fibres may be at least partially bleached.

The sub-layer may comprise wear resistant particles.

The sub-layer may further comprise colour pigments and/or a colorant. The colour pigment may be of dark colour, or may be white, such as TiO2.

The wood veneer may comprise holes and/or cracks, wherein the sub-layer fills the holes and/or cracks of the wood veneer.

The surface layer may further comprise a protective overlay, comprising wear resistant particles, arranged on the wood veneer.

The sub-layer may comprise a foaming agent. Additives such as blowing agents may be included in the sub-layer. The blowing agents may be physical foaming agents such as Expancel® and/or chemical blowing agents such as AIBN (azoisobutyronitrile) or ADC (azodicarbonamide).

The surface layer may be a cork layer.

The building panel may be a floor panel, a wall panel, a ceiling panel, a furniture component, skirting boards, mouldings, edging profiles etc.

An alternative to the veneer may be a paper or a plastic foil provided with apertures that extends through the paper or the plastic foil.

A second aspect of the disclosure is a method to produce a building panel, comprising the step of:
  applying a wood fibre powder and a binder on a wood fibre based core, to obtain a sub-layer;
  applying a wood veneer, comprising holes through the veneer, on the sub-layer,
  applying heat and pressure to bond the veneer, the sub-layer and the wood fibre based core together, wherein a portion of the wood fibre powder and the binder is pressed into the holes.

The method preferably comprises the step of applying a foaming agent. The foaming agent may facilitate the displacement of the wood fibre powder and the agent into the holes.

The wood fibre powder may comprise lignocellulosic particles or cellulose particles.

The method may comprise the step of applying different colour pigments, such that the colour of the visible sub-layer portion varies along the building panel, or such that the portion of the sub-layer in the holes forms a pattern.

After applying pressure, the surface layer may comprise embossed portions, and wherein a part of the sub-layer is more compressed under an embossed surface portion than under a non-embossed surface portion.

The method may further comprise applying a protective overlay with wear resistant particles on the wood veneer, preferably prior to pressing.

The sub-layer may further comprise colour pigments and/or a colorant.

The sub-layer may comprise wear resistant particles.

According to a third aspect of the disclosure, a building panel is provided. The building panel comprises a surface layer comprising a wood veneer, a core, and a sub-layer arranged between the surface layer and the core. The surface layer has surface portions comprising material from the sub-layer extending into the wood veneer.

Preferably, the core is a wood fibre based core.

Preferably, the sub-layer comprises wood fibres and a binder.

BRIEF DESCRIPTION OF THE DRAWINGS

The disclosure will by way of example be described in more detail with reference to the appended schematic drawing, which shows an embodiment of the disclosure.

FIG. 1 illustrates a building panel according to an embodiment of the disclosure.

DETAILED DESCRIPTION

FIG. 1 shows a building panel with a surface layer 1 comprising a wood veneer, a core 2, and a sub-layer 3 arranged between the surface layer 1 and the core 2. The core 2 may be wood fibre based board such as MDF, HDF, particle board, plywood, OSB etc. The core 2 may be a WPC (Wood Plastic Composite). The core 2 may in one embodiment be a mineral board. The building panel may be a floor panel, a wall panel, a ceiling panel, a furniture component, skirting boards, mouldings, edging profiles, etc.

A low quality wood veneer is used as a surface layer 1. The veneer comprises cracks and other similar defects. The veneer is pressed against the core 2 with a powder based sub-layer 3 comprising wood fibres 4 and a binder 5 such that the powder floats and fills the cracks. The panel comprises after pressing a surface layer 1 with surface portions 6 comprising material from the sub-layer 3. The surface portions 6 comprising material from the sub-layer 3 extend into the wood veneer. The surface portions comprising material from the sub-layer may be flush with a remainder of the surface layer. A "surface portion" is a portion of the surface layer that is visible on the exposed surface of the surface layer facing away from the core.

In one embodiment, the sub-layer 3 comprises a binder applied in liquid form.

The panel may be pressed against an embossed press plate such that a part of the sub-layer 3 is more compressed under an embossed portion 8 than under a non-embossed surface portion.

Preferably the building panel is a floor panel that may have a powder based balancing layer 7. A powder based balancing layer 7 may also be applied on any other type of building panel. The powder based balancing layer 7 may comprise lignocellulosic particles or cellulose particles and a binder, preferably a thermosetting binder, more preferably an amino resin such as melamine formaldehyde resin. The binder may also be applied in powder form, the sub-layer 3 being a dry powder layer. In one embodiment, the sub-layer 3 is a pre-pressed layer, wherein the binder has not completely cured during the pre-pressing.

The binder of the sub-layer 3 may be a thermosetting resin, such as, for, example a melamine formaldehyde resin. The sub-layer 3 may also comprise colour pigments and wear resistant particles such as aluminium oxide particles. The wood fibres of the sub-layer 3 may be lignocellulosic particles or cellulose particles. The wood fibres of the sub-layer 3 may be at least partially bleached. The sub-layer may comprise a foaming agent. The wood veneer may be replaced by a cork veneer or a stone veneer.

The sub-layer 3 may be applied in an amount of 200-600 g/m2, preferably 300-500 g/m2 such as about 400 g/m2. The amount of binder applied for the sub-layer 3 may be 100-300 g/m2, preferably 150-250 g/m2 such as about 200 g/m2. The sub-layer 3 may comprise the binder in an amount of 30-80 wt %, preferably in an amount of 40-60 wt % such as about 50 wt %.

In an embodiment, a produced building panel may be 6-25 mm thick, preferably 8-15 mm thick after pressing, while the core may be 5-22 mm thick, preferably 7-14 mm thick. The sub-layer may be 0.1-2 mm thick after pressing.

Using a protective overlay with wear resistant particles applied on the veneer is not excluded and this could increase the wear resistance of a wood veneer. Dry and wet overlays, which are produced by production methods where for example thermosetting resins in dry or wet form are mixed with aluminium oxide, without any fibres could also be used. Aluminium oxide particles mixed with melamine powder could for example be applied on a wood veneer prior to pressing and a wear resistant surface could be obtained without any surface coating after pressing. Dry and wet overlays may be applied on the surface layer prior to pressing. Wax may be applied, for example, as a powder, prior to pressing on the veneer. A lacquer may also be applied on the surface layer after pressing. A protective foil may also be applied on the veneer prior to pressing or on the surface layer after pressing.

It is also contemplated that the building panel is provided with a second surface layer (not shown) comprising a wood veneer of the above described type. A sub-layer of the above described type is arranged between the second surface layer and a second surface of the core of the above described type. The second surface layer has surface portions comprising material from the sub-layer extending into the wood veneer. The second surface of the core faces away from the surface layer described above with reference to FIG. 1. In this embodiment, the surface layer described above with reference to FIG. 1 is considered as first surface layer.

The building panel may be produced by a method comprising the step of:
  applying a wood fibre powder and a binder on a wood fibre based core, to obtain a sub-layer;
  applying a wood veneer, comprising holes through the veneer, on the sub-layer,
  applying heat and pressure to bond the veneer, the sub-layer and the wood fibre based core together, wherein a portion of the wood fibre powder and the binder is pressed into the holes.

The method preferably comprises the step of applying a foaming agent. The foaming agent may facilitate the displacement of the wood fibre powder and the agent into the holes.

The wood fibre powder may comprise lignocellulosic particles or cellulose particles.

The method may comprise the step of applying different colour pigments, such that the colour of the visible sub-layer portion varies along the building panel, or such that the portion of the sub-layer in the holes forms a pattern.

The invention claimed is:
1. A building panel comprising:
  a surface layer comprising a wood veneer, the wood veneer comprising porous portions and non-porous portions,
  a wood fibre based core, and
  a sub-layer arranged between the surface layer and the wood fibre based core, the sub-layer being a separate discrete layer from the core,
  wherein the sub-layer comprises wood fibres and a binder,
  wherein the surface layer has surface portions comprising material from the sub-layer extending into the wood veneer, and
  wherein the surface layer comprising embossed portions and protrusions, wherein the binder of the sub-layer bonds the porous portions of the wood veneer in a compressed position to form the embossed portions, and wherein the binder does not bond the non-porous portions of the wood veneer in the compressed position so that the non-porous portions of the wood veneer form the protrusions.

2. The building panel as claimed in claim 1, wherein the surface portions comprising material from the sub-layer are flush with at least a portion of the surface layer.

3. The building panel as claimed in claim 1, wherein the sub-layer comprises colour pigments and/or a colorant.

4. The building panel as claimed in claim 1, wherein the sub-layer comprises wear resistant particles.

5. The building panel as claimed in claim 1, further comprising a powder-based balancing layer.

6. The building panel as claimed in claim 1, wherein the wood veneer comprises holes and/or cracks, wherein the sub-layer fills the holes and/or cracks of the wood veneer.

7. The building panel as claimed in claim 1, further comprising a protective overlay comprising wear resistant particles arranged on the surface layer.

8. The building panel as claimed in claim 1, wherein the binder is liquid.

9. The building panel as claimed in claim 1, wherein the binder in the sub-layer is a thermosetting resin.

10. The building panel as claimed in claim 1, wherein the binder in the sub-layer is a melamine formaldehyde resin.

11. The building panel as claimed in claim 1, wherein the sub-layer comprises a foaming agent.

12. The building panel as claimed in claim 11, wherein the foaming agent includes a chemical blowing agent additive.

13. The building panel as claimed in claim 1, further comprising:
a second surface layer comprising a second wood veneer, the second surface layer being arranged on an opposite side of the core from the surface layer; and
a second sub-layer arranged between the second surface layer and the core,
wherein the second surface layer has surface portions comprising material from the second sub-layer extending into the second wood veneer.

14. A building panel comprising:
a surface layer comprising a wood veneer, the wood veneer comprising porous portions and non-porous portions,
a wood fibre based core, and
a sub-layer arranged between the surface layer and the wood fibre based core,
wherein the sub-layer comprises wood fibres, a binder and colour pigments and/or a colorant,
wherein the surface layer has surface portions comprising material from the sub-layer extending into the wood veneer, and
wherein the surface layer comprising embossed portions and protrusions, wherein the binder of the sub-layer bonds the porous portions of the wood veneer in a compressed position to form the embossed portions, and wherein the non-porous portions of the wood veneer form the protrusions by containing less of the binder than the porous portions.

15. The building panel as claimed in claim 14, further comprising a powder-based balancing layer.

16. The building panel as claimed in claim 15, further comprising a protective overlay comprising wear resistant particles arranged on the surface layer.

17. A building panel comprising:
a surface layer comprising a wood veneer, the wood veneer comprising porous portions and non-porous portions,
a wood fibre based core, and
a sub-layer arranged between the surface layer and the wood fibre based core,
wherein the sub-layer comprises wood fibres, a binder and wear resistant particles,
wherein the surface layer has surface portions comprising material from the sub-layer extending into the wood veneer,
wherein the binder is between 40-60 wt-% of the sub-layer, and
wherein the surface layer comprising embossed portions and protrusions, wherein the binder of the sub-layer bonds the porous portions of the wood veneer in a compressed position to form the embossed portions, and wherein the binder does not bond the non-porous portions of the wood veneer in the compressed position so that the non-porous portions of the wood veneer form the protrusions.

18. The building panel as claimed in claim 17, wherein the binder is liquid.

19. The building panel as claimed in claim 17, wherein the sub-layer comprises a foaming agent.

20. The building panel as claimed in claim 17, further comprising a powder-based balancing layer.

21. The building panel as claimed in claim 20, further comprising a protective overlay comprising wear resistant particles arranged on the surface layer.

22. A building panel comprising:
a surface layer comprising a wood veneer, the wood veneer comprising relatively high-density portions and relatively low-density portions,
a wood fibre based core, and
a sub-layer arranged between the surface layer and the wood fibre based core, the sub-layer being a separate discrete layer from the core,
wherein the sub-layer comprises wood fibres and a binder,
wherein the surface layer has surface portions comprising material from the sub-layer extending into the wood veneer, and
wherein the surface layer comprises embossed portions and protrusions, wherein the binder of the sub-layer bonds the relatively low-density portions of the wood veneer in a compressed position to form the embossed portions, and wherein the binder does not bond the relatively high-density portions of the wood veneer in the compressed position so that the relatively high-density portions of the wood veneer form the protrusions.

* * * * *